US008811308B1

(12) United States Patent
Goodson (10) Patent No.: US 8,811,308 B1
(45) Date of Patent: Aug. 19, 2014

(54) SYSTEMS AND METHODS FOR ALLOCATING FRAGMENTS WITHIN BONDING GROUPS (75) Inventor: Richard Goodson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 839 days.

(21) Appl. No.: 12/940,575

(22) Filed: Nov. 5, 2010

(51) Int. Cl.
H04W 4/00 (2009.01)
(52) U.S. Cl.
USPC .......................................... 370/329
(58) Field of Classification Search
USPC .......................................... 370/329
See application file for complete search history.

(56) References Cited

U.S. PATENT DOCUMENTS

| 7,006,500 | B1 | 2/2006 | Pedersen et al. | |
|---|---|---|---|---|
| 2007/0097907 | A1 | 5/2007 | Cummings | |
| 2009/0122700 | A1* | 5/2009 | Aboba et al. | 370/230 |
| 2009/0135850 | A1 | 5/2009 | Hong et al. | |

OTHER PUBLICATIONS

Rushing, et al., U.S. Appl. No. 12/359,041, "Systems and Methods for Protecting Bonding Engines in Network Communications,", filed Jan. 23, 2009.

* cited by examiner

Primary Examiner — Shripal Khajuria
(74) Attorney, Agent, or Firm — Maynard Cooper & Gale, P.C.; Jon E. Holland (57) ABSTRACT An exemplary communication system has logic and memory for storing data indicative of data rates for transceivers coupled to a bonding group. The transceivers are coupled to a plurality of queues, and the logic is configured to determine a plurality of values based on the data. Each of the values indicates a number of bits in a respective one of the queues and is based on the data rate indicated by the data for a respective one of the transceivers. The logic is configured to receive a data packet and to fragment the data packet into a plurality of fragments. The logic is further configured to allocate the fragments to communication connections of the bonding group based on the values and to transmit the fragments to the transceivers such that each of the fragments is transmitted across the respective communication connection to which the fragment is allocated.

31 Claims, 9 Drawing Sheets

SYSTEMS AND METHODS FOR ALLOCATING FRAGMENTS WITHIN BONDING GROUPS

BACKGROUND

A Digital Subscriber Line Access Multiplexer (DSLAM) is a network device that provides a broadband connection to one or more customers over a plurality of respective subscriber lines. The DSLAM is connected toward the customer via a plurality of subscriber lines to Customer Premise Equipment (CPE) and is connected toward the network via at least one high-speed connection. The modulation format used by a DSLAM for communication over subscriber lines may be, for example, Asymmetric Digital subscriber Line (ADSL), Very-high-bitrate Digital Subscriber Line (VDSL), Symmetric-high-bitrate Digital Subscriber Line (SHDSL), or other known DSL modulation formats.

During operation, the DSLAM receives multiple signals from the plurality of subscriber lines and multiplexes the signals for transmission toward the network over the high-speed connection. The DSLAM also receives a high-speed data stream from the network and demultiplexes the high-speed data stream for transmission across the plurality of subscriber lines. In this regard, each packet received from the high-speed connection includes header information comprising a destination address or other identifier that indicates on which subscriber line the packet is to be transmitted.

Oftentimes, a subscriber's CPE may be connected to more than one subscriber line. In such a scenario, the subscriber lines extending to the same customer premises (CP) may be bonded to form a high-speed data channel having an aggregated data rate that is greater than the data rate of any single one of the subscriber lines. When a packet destined for such CP is received by the DSLAM, the packet is fragmented into a plurality of fragments. The fragments are then transmitted across the subscriber lines such that each fragment is carried by a single respective subscriber line, and the plurality of fragments are recombined at the CPE to form the original data packet fragmented at the DSLAM. The process of fragmenting packets of a data stream for transmission over a plurality of subscriber lines and then recombining the fragments after transmission is referred to as "bonding." Bonding allows for faster delivery of a stream of data packets than is otherwise possible with a single subscriber line.

DESCRIPTION OF DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the figures.

DESCRIPTION

Figure 1:
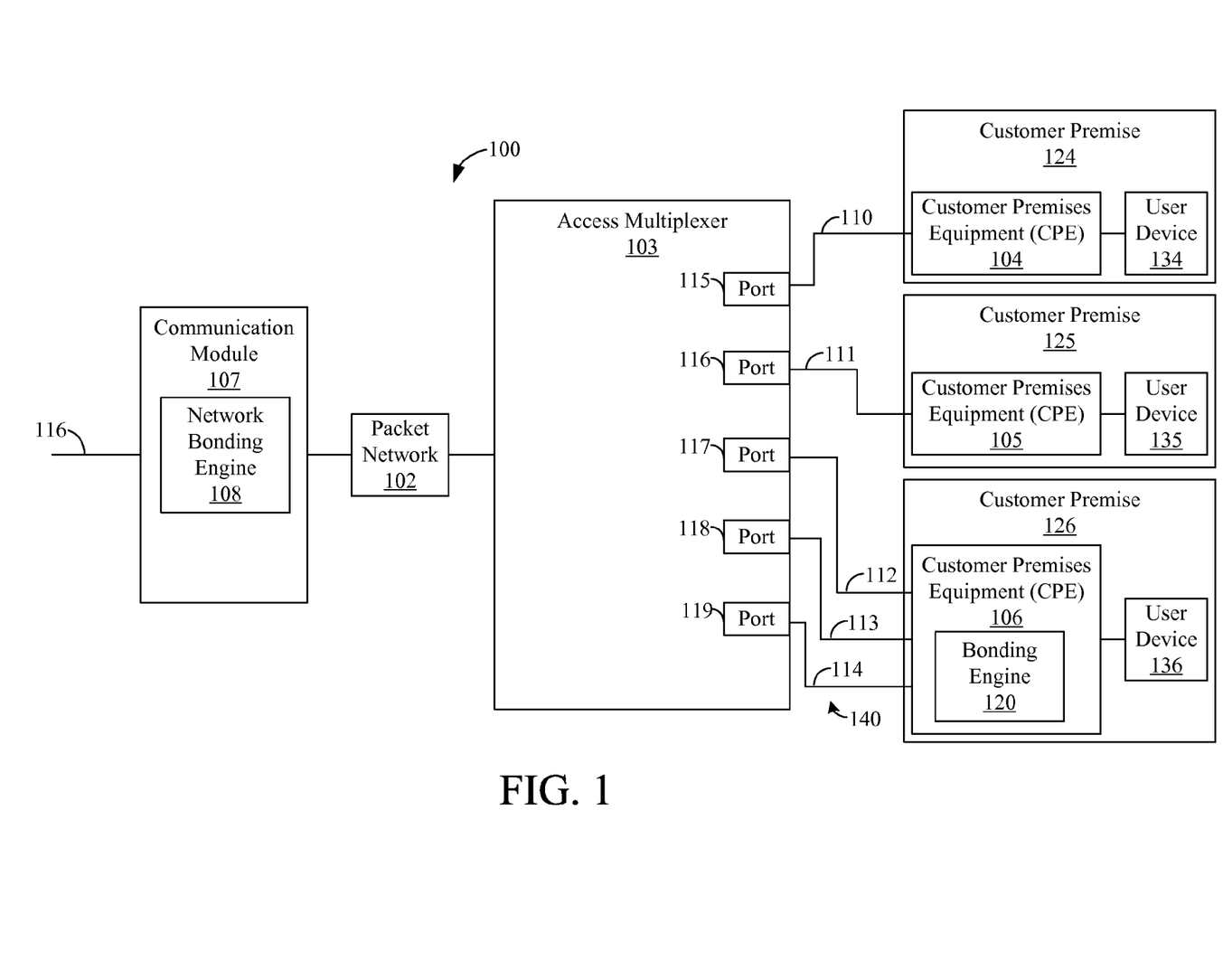
FIG. 1 is a block diagram depicting an exemplary embodiment of a communication system in accordance with the present disclosure.

FIG. 1 is a block diagram depicting an exemplary embodiment of a communication system 100 in accordance with the present disclosure. The communication system 100 comprises an access multiplexer 103 that is communicatively connected to a communication module 107. In one embodiment, the access multiplexer 103 utilizes DSL modulation formats and may be referred to as a Digital Subscriber Line Access Multiplexer (DSLAM), but other modulation formats are possible in other embodiments.

The communication module 107 may reside at any network location. In one exemplary embodiment, the communication module 107 resides in a core network, and the access multiplexer 103 resides either at a central office (CO) or at an intermediate point between a CO and one or more customer premises (CP). However, in other embodiments, the communication module 107 or components of the communication module 107, such as a bonding engine, which will be described in more detail hereafter, may reside at other locations, such as the same premises as the access multiplexer 103, and/or be integrated with the access multiplexer 103.

In one exemplary embodiment, the access multiplexer 103 is coupled to the communication module 107 via a packet network 102, such as an Ethernet network or an IP (Internet Protocol) network. Each data packet transmitted in the packet network 102 comprises payload data and overhead data, sometimes referred to as a "header." The overhead data comprises a destination address or other identifier that identifies the equipment to which the data packet is destined.

Note that while the packet network 102 is shown in FIG. 1, such packet network 102 is not necessary for other embodiments. For example, the communication module 107 and the access multiplexer 103 may be connected via a network connection, such as an optical fiber that extends from the communication module 107 to the access multiplexer 103.

In addition, the communication system 100 comprises Customer Premises Equipment (CPE) 104, CPE 105, and CPE 106 respectively residing at a plurality of customer premises 124-126. The CPEs 104-106 are coupled to the access multiplexer 103 via communication connections 110-114 (e.g., twisted-wire pairs), which also may be referred to as "subscriber lines." As an example, the modulation format used for communication across the connections 110-114 may be ADSL, HDSL, VDSL, SHDSL, or other known DSL or non-DSL formats. Each CPE 104-106 is also coupled to at least one respective user device 134-136, such as a telephone, computer, facsimile machine, or other known or future-developed user device.

Note that the CPE 104-106 at any of the customer premises 124-126 may be coupled to any number of user devices. In addition, FIG. 1 depicts three CPEs 104-106 coupled to five connections 110-114. However, three CPEs 104-106 are shown for exemplary purposes only, and there may be additional or fewer CPEs and/or connections in other embodiments of the present disclosure.

Furthermore, in some instances, there may be only a single communication connection extending from the access multiplexer 103 to the CPE, which is the case for the connections 110 and 111 extending to CPE 104 and CPE 105, respectively. However, in some instances, a given CPE may be coupled to a plurality of communication connections, which is the case for CPE 106. In this regard, there are three communication connections 112-114 that connect the access multiplexer 103 to the CPE 106, but other numbers of communication connections for the CPE 106 are possible in other embodiments. When there are multiple connections, such as connections 112-114, extending to the same CPE, the connections may be bonded to form a bonding group for providing a higher aggregated data rate than is possible for a single connection, as will be described in more detail hereafter.

The communication module 107 receives a stream of data packets (not shown) from at least one network connection 116. The network connection 116 may be, for example, an optical fiber or other type of network connection. As will be described in more detail hereafter, some of the data packets may be fragmented by the bonding engine 108 into a plurality of fragments, which are then packetized and transmitted to the access multiplexer 103, and some of the data packets received by the communication module 107 may be transmitted to the access multiplexer 103 without being fragmented by the bonding engine 108.

The access multiplexer 103 receives data packets from the communication module 107 and transmits each such data packet to the appropriate connection 110-114 based on packet's intended destination. In this regard, each data packet the access multiplexer 103 receives from the communication module 107 comprises payload data (not shown) and a header (not shown). The header comprises overhead information that is used by the access multiplexer 103 to select the appropriate connection 110-114 for transmitting the packet.

As an example, in FIG. 1, the packets destined for the user device 134 travel over a single connection 110. In such case, the access multiplexer 103 maps the packets having the destination address of the user device 134 to the connection 110. Thus, each such packet is forwarded by the access multiplexer 103 to the connection 110. Similarly, the access multiplexer 103 may map the destination address of the user device 135 to the connection 111 so that data packets having such destination address are forwarded to the connection 111.

In one exemplary embodiment, the connections 112-114 coupled to the CPE 106 are bonded by the network bonding engine 108 of the communication module 107 thereby forming a bonding group 140. If the destination address of a data packet received over the network connection 116 identifies the user device 136 serviced by the bonding group, then the communication module 107 transmits the data packet to the network bonding engine 108. The network bonding engine 108 fragments the data packet into a plurality of fragments. Fragmenting a data packet into a plurality of fragments allows the data packet to be communicated via the plurality of communication connections 112-114 in which each fragment traverses across a respective communication connection 112-114.

The network bonding engine 108 allocates each fragment to a respective communication connection 112-114 thereby controlling which connection 112-114 is used to carry the fragment. In this regard, the network bonding engine 108 appends to the fragment a connection identifier identifying one of the connections 112-114 to which the fragment is allocated. The network bonding engine 108 then transmits each fragment to the access multiplexer 103. As will be described in more detail hereafter, the fragment and the connection identifier appended to the fragment may be packetized for transmission through the packet network 102 when the communication module 107 is remote from the access multiplexer 103, as shown by FIG. 1. The access multiplexer 103 comprises data (not shown in FIG. 1) that maps connection identifiers to connections 112-114. For each fragment, the access multiplexer 103 forwards the fragment to the connection 112-114 that is mapped to the connection identifier appended to the fragment.

As fragments are sent to the access multiplexer 103, the network bonding engine 108 estimates the number of bits that are currently queued in the access multiplexer 103 for each connection 112-114. In one exemplary embodiment, as will be described in more detail hereafter, the estimate is based upon the number of bits transmitted to the access multiplexer 103 less the number of bits that have been predictably transmitted from the access multiplexer 103 across the connection 112-114 based upon the connection's downstream transmission rate.

The access multiplexer 103 receives the fragments and transmits each fragment across the connection 112-114 corresponding to the fragment's connection identifier. Bonding engine 120 of the CPE 106 receives the fragments transmitted by the access multiplexer 103. If the fragments are packetized, the CPE 106 de-encapsulates the received packets to recover the fragments. The bonding engine 120 recombines the fragments into the original data packet fragmented by the network bonding engine 108. Such process of fragmenting a data packet, transmitting fragments of the data packet over separate communication connections, and recombining the fragments is referred to as "bonding."

Figure 2:
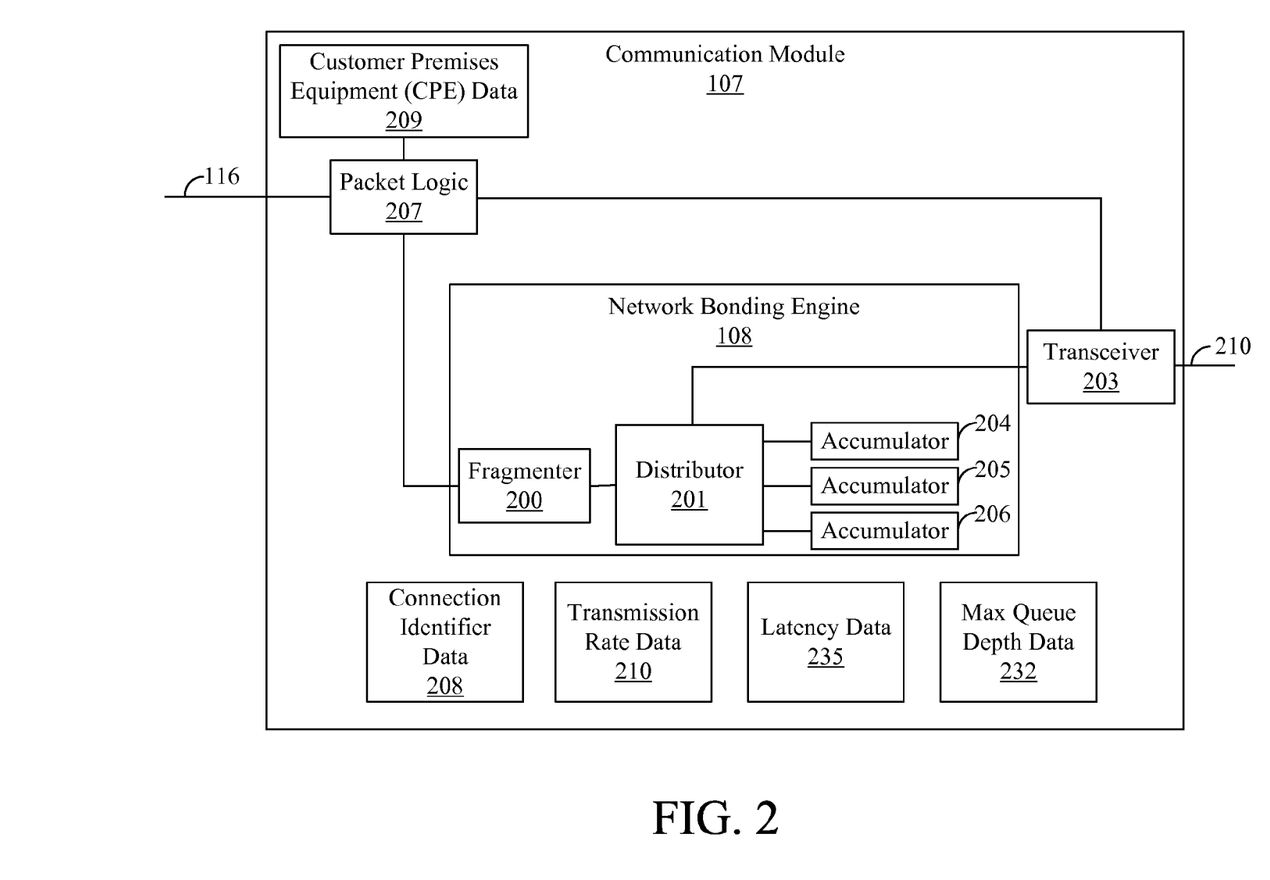
FIG. 2 is a block diagram depicting an exemplary embodiment of a communication module, such as is depicted in FIG. 1.

FIG. 2 depicts an exemplary embodiment of a communication module 107. The communication module 107 comprises packet logic 207, the network bonding engine 108, CPE data 209, and a transceiver 203. In addition, the communication module 107 comprises connection identifier data 208, transmission rate data 210, maximum queue depth data 232, and latency data 235. However, it should be noted that, in at least one embodiment described hereafter, the maximum queue depth data 232 and the latency data 235 are not used in the operation of the system 100, and such data 232 and 235 may be omitted for such embodiments.

The CPE data 209 indicates which packets are to be forwarded to the network bonding engine 108. As an example, the CPE data 209 may define a list of addresses. If a destination address of a received packet corresponds to (e.g., matches) one of the addresses in the data 209, then the packet logic 207 forwards the packet to the network bonding engine 108. In one exemplary embodiment, the CPE data 209 is defined such that packets destined for the user device 136 (FIG. 1) coupled to the CPE 106 are forwarded to the network bonding engine 108, which fragments such packets. The data packets received by the network bonding engine 108 for fragmenting shall be referred to hereafter as "ingress packets" for clarity of description.

The connection identifier data 208 has connection identifiers identifying each of the connections 112-114. As will be described in more detail hereafter, such data 208 is used to allocate a fragment to a particular connection 112-114.

The transmission rate data 210 indicates a downstream transmission rate for each of the connections 112-114. In one embodiment, the transmission rate data 210 is based upon rate information that is transmitted from the CPE 106, which is described further herein. In this regard, the CPE 106 from time-to-time transmits control data to the network bonding engine 108 of the communication module 107 indicating the current downstream transmission rate for each of the connections 112-114. The distributor 201 receives the control data and stores the information indicative of the current downstream transmission rate for each connection 112-114 in the transmission rate data 210. Thus, the transmission rate data 210 can be analyzed to determine the current downstream transmission rate across each connection 112-114, as indicated by the control data from the CPE 106.

In operation, the packet logic 207 receives a data packet from the network connection 116. The packet logic 207 analyzes the destination address of the received data packet and compares the destination address to the CPE data 209. In this regard, the packet logic 207 determines whether the CPE data 209 indicates that the data packet is to be forwarded to the network bonding engine 108.

If the CPE data 209 does not indicate that the data packet is to be sent to the network bonding engine 108, the packet logic 207 transmits the data packet to the transceiver 203. The transceiver 203 transmits the data packet to the packet network 102 (FIG. 1) via a connection 210. If the CPE data 209 indicates that the data packet is to be sent to the network bonding engine 108, the packet logic 207 forwards the data packet to the network bonding engine 108.

The network bonding engine 108 comprises a fragmenter 200, a distributor 201 and a plurality of accumulators 204-206. In one embodiment, each accumulator 204-206 corresponds to a respective one of the communication connections 112-114. Each accumulator 204-206 stores a bit count that represents a current queue depth estimated for the corresponding connection 112-114. As used herein, "queue depth" refers to the number of bits currently in queue for transmission across a given connection.

For each data packet (referred to as an "ingress packet") forwarded to the bonding engine 108, the fragmenter 200 fragments the ingress packet into a number of separate and distinct fragments. Each fragment comprises a portion of the ingress packet as well as overhead data (e.g., a sequence indicator) that can be used to reconstruct the fragmented ingress packet using all the packet's fragments. After fragmenting the ingress packet, the fragmenter 200 transmits each fragment to the distributor 201.

Upon receipt of a fragment, the distributor 201 selects one of the connections 112-114 for carrying the fragment, and assigns the connection identifier of the selected connection to the fragment. The distributor 201 encapsulates the fragment into a data packet based upon the selected connection 112-114. In this regard, the distributor 201 defines the packet's overhead such that the packet is transmitted from the bonding engine 108 to the access multiplexer 103 and across the connection 112-114 selected by the distributor 201 for carrying the encapsulated fragment. For example, based on the connection identifier data 108, the distributor 201 may insert into the packet's overhead the assigned connection identifier, which is used by the access multiplexer 103 to forward the packet to the port 117-119 coupled to the selected connection 112-114. For clarity of description, the data packets transmitted from the bonding engine 108 and carrying fragments of ingress packets shall be referred to as "egress packets."

In one exemplary embodiment, the distributor 201 selects the connection 112-114 that is to carry a fragment based on the accumulators 204-206. In particular, the distributor 201 assigns to the fragment the connection identifier for the connection 112-114 that is fed by the queue having the lowest estimated queue depth in an effort to reduce latency.

In this regard, when a fragment is allocated to a particular one of the connections 112-114 and sent to the access multiplexer 103, the distributor 201 increases the bit count of the accumulator 204-206 associated with the particular connection 112-114 to which the fragment is allocated. In particular, the distributor 201 increases such bit count by the number of bits being sent for queuing. In addition, the distributor 201 decreases the bit count at the current downstream transmission rate for the selected connection 112-114, as indicated by the transmission rate data 210. Accordingly, each accumulator implements a "leaky bucket" algorithm in which its bit count is constantly reduced at a rate equal to the downstream transmission rate specified for the associated connection and is increased as fragments are allocated for transmission across such associated connection 112-114. Thus, at any given time, the bit count in each accumulator 204-206 represents an estimation of the number of bits that are currently in queue at the access multiplexer 103 waiting to be sent across the associated connection 112-114, or, in other words, the queue depth for the queue feeding such connection.

As an example, assume that the accumulator 204 is associated with the connection 112. Further assume that, over a given time period, it is estimated that x number of bits are transmitted across the connection 112 based on the transmission rate data 210. Further assume that, during such time period, the distributor 201 transmits to the access multiplexer 103 y bits for transmission across the connection 112. In such example, at the end of the time period, the change in the bit count for the accumulator 204 since the start of the time period should be equal to y−x, assuming that the bit count remains positive. In this regard, in one exemplary embodiment, the bit count is limited to zero such that it is not allowed to fall below zero, and a zero value indicates that the queue feeding the connection 112 is empty. The bit count also may be limited to a maximum value.

In this regard, in one exemplary embodiment, maximum queue depth data 232 is stored in the communication module 107, as shown by FIG. 2, and such data 232 may be provisioned by a technician or otherwise provided. The data 232 specifies a maximum bit count for each respective accumulator 204-206, and each accumulator 204-206 is prevented from exceeding its respective maximum queue depth value. The maximum queue depth value for a given accumulator 204-206 is a threshold that is based on the queue depth of the queue feeding the associated connection 112-114. As an example, the maximum queue depth value for the accumulator 204 may be established such that if the maximum queue depth value is reached, then the queue at the access multiplexer 103 feeding the associated connection 112 is likely full or close to being full. If allocation of a fragment to the connection 112 will result in the bit count for the accumulator 204 reaching or exceeding the maximum queue depth value for the accumulator 204, then the distributor 201 is configured to allocate the fragment to another connection 113 or 114 even if the bit count for the accumulator 204 is less than those for the accumulators 205 and 206. Accordingly, allocation of the fragments to the connection 112 is effectively disabled until the bit count of the accumulator 204 decreases or a fragment is received that would not cause the bit count to exceed the maximum queue depth value for the accumulator 204. Such limiting of the fragments allocated to a particular connection 112-114 can prevent loss of data due to packet dropping or data overruns at the access multiplexer 103.

Moreover, upon receiving a fragment, the distributor 201 determines which accumulator 204-206 has the lowest bit count and, thus, is associated with the connection 112-114 fed by the queue with the lowest queue depth. The distributor 201 then allocates the fragment to the connection 112-114 associated with such accumulator, assuming that its maximum queue depth value would not be exceeded due to such allocation. The distributor 201 retrieves from the connection identifier data 208 the connection identifier associated with the foregoing accumulator associated with the connection 112-114 to which the fragment is allocated. The distributor 201 then encapsulates the fragment into an egress packet comprising a header and inserts the retrieved connection identifier in the header as the packet's destination address. In such embodiment, the fragment is the packet's payload data. After packetizing the fragment into an egress packet, the distributor 201 transmits the egress packet to the transceiver 203, which transmits the egress packet across the connection 210 to the access multiplexer 103. The distributor 201 then adds the size of the packet to the accumulator associated with the connection identifier of the packet.

The access multiplexer 103 forwards the received egress packet to the port 117-119 that is coupled to the connection 112-114 identified by the packet's connection identifier, which was previously assigned to the fragment and inserted into the header by the distributor 201. As egress packets are transmitted across the connections 112-114, the CPE 106 de-encapsulates such packets to recover the fragments. Once each of the fragments associated with an ingress packet is sent to the CPE 106, the bonding engine 120 recombines the fragments in order to recover the ingress packet originally fragmented by fragmenter 200.

Various other algorithms for allocating the fragments to connections 111-114 are possible. As an example rather than selecting the connection 112-114 associated with the lowest accumulator bit count, the distributor 201 may allocate based on factors such as latency and/or transmission rate. In one exemplary embodiment, the distributor 201 calculates a metric (M) for each connection 112-114. The metric is based, not only on the bit count of the associated accumulator 204-206, but also latency (if known) and transmission rate.

As an example, for each connection 112-114, the distributor 201 may calculate a metric (M) according to the formula $M=L+[FS+A]/R$, where L is the latency (measured in seconds) in the connection that is independent of fragment size and the downstream transmission rate of the connection, where FS is the fragment size (number of bits) of the fragment being allocated, where A is the current bit count for the associated accumulator 204-206, and where R is the downstream transmission rate of the connection. The latency for each connection 112-114 may be determined a priori and stored in latency data 235 at the communication module, as shown by FIG. 2. After calculating M for each connection 112-114 of the bonding group 140, the distributor 201 allocates the fragment to the connection associated with the lowest M. Accordingly, the fragment may be allocated to a connection 112-114 that has a greater backlog, as indicated by a higher bit count in the associated accumulator 204-206, but a faster transmission rate than another connection of the bonding group 140. In such a scenario, the fragment may arrive at the CPE 106 sooner if allocated to the connection 112-114 having the greater backlog. Various other algorithms for allocating the fragments to the connections 112-114 are possible in other embodiments.

Figure 3:
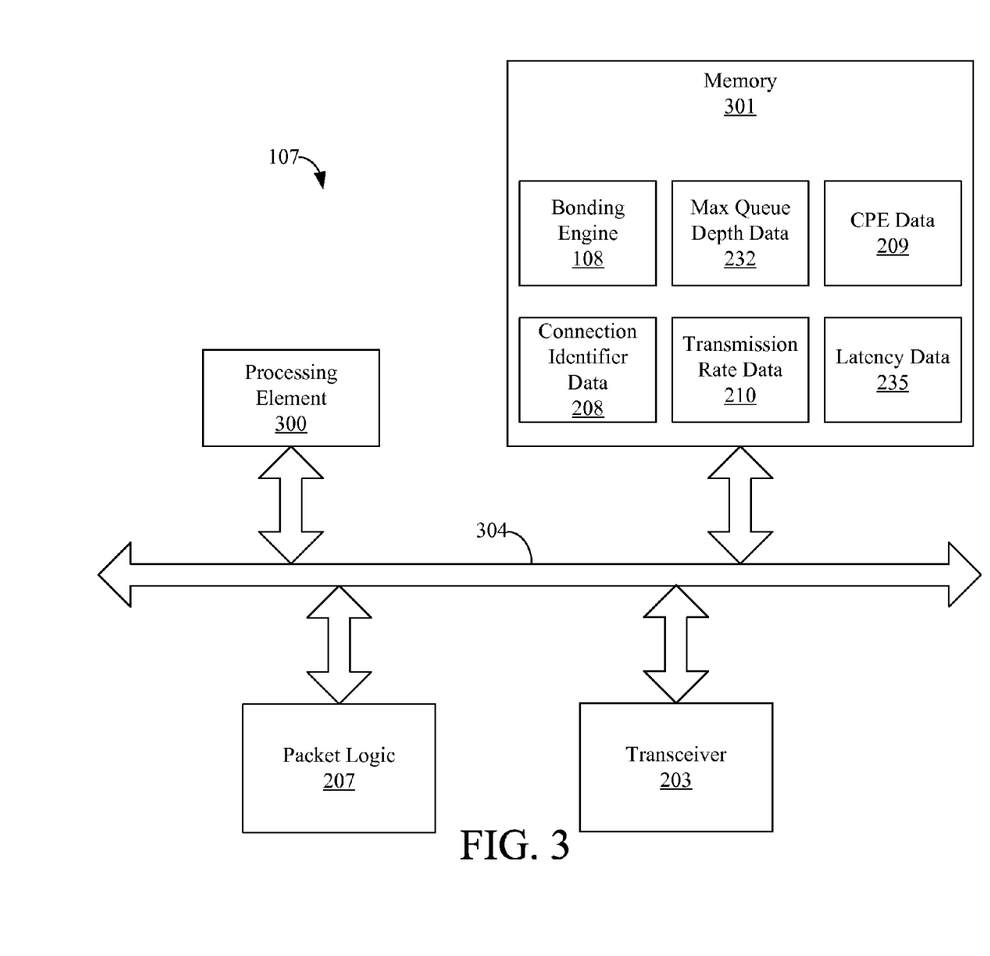
FIG. 3 is a block diagram depicting an exemplary embodiment of a communication module, such as is depicted in FIG. 2.

FIG. 3 depicts an exemplary embodiment of a communication module 107. The exemplary embodiment of the communication module 107 includes a processing element 300, which comprises processing hardware for executing instructions stored in memory 301. The processing element 300 communicates to and drives the other elements within the communication module 107 via a local interface 304, which can include at least one bus.

Furthermore, the communication module 107 comprises the packet logic 207 and the transceiver 203. The packet logic 207 can be firmware, hardware, software or a combination of firmware, hardware, and software. In the exemplary embodiment shown in FIG. 3, the packet logic 207 is shown as hardware that communicates with other elements of the communication module 107 over the local interface 304. The transceiver 203 is any device that is capable of communicating data packets (not shown) over the connection 210 (FIG. 2).

In the embodiment of the communication module 107 shown in FIG. 3, the bonding engine 108 is implemented in software and stored in memory 301. In other embodiments, the bonding engine 108 may be implemented in software, firmware, hardware, or a combination of software, firmware, and/or hardware. The memory 301 also stores the connection identifier data 208, transmission rate data 210, CPE data 209, maximum queue depth data 232, and latency data 235.

Figure 4:
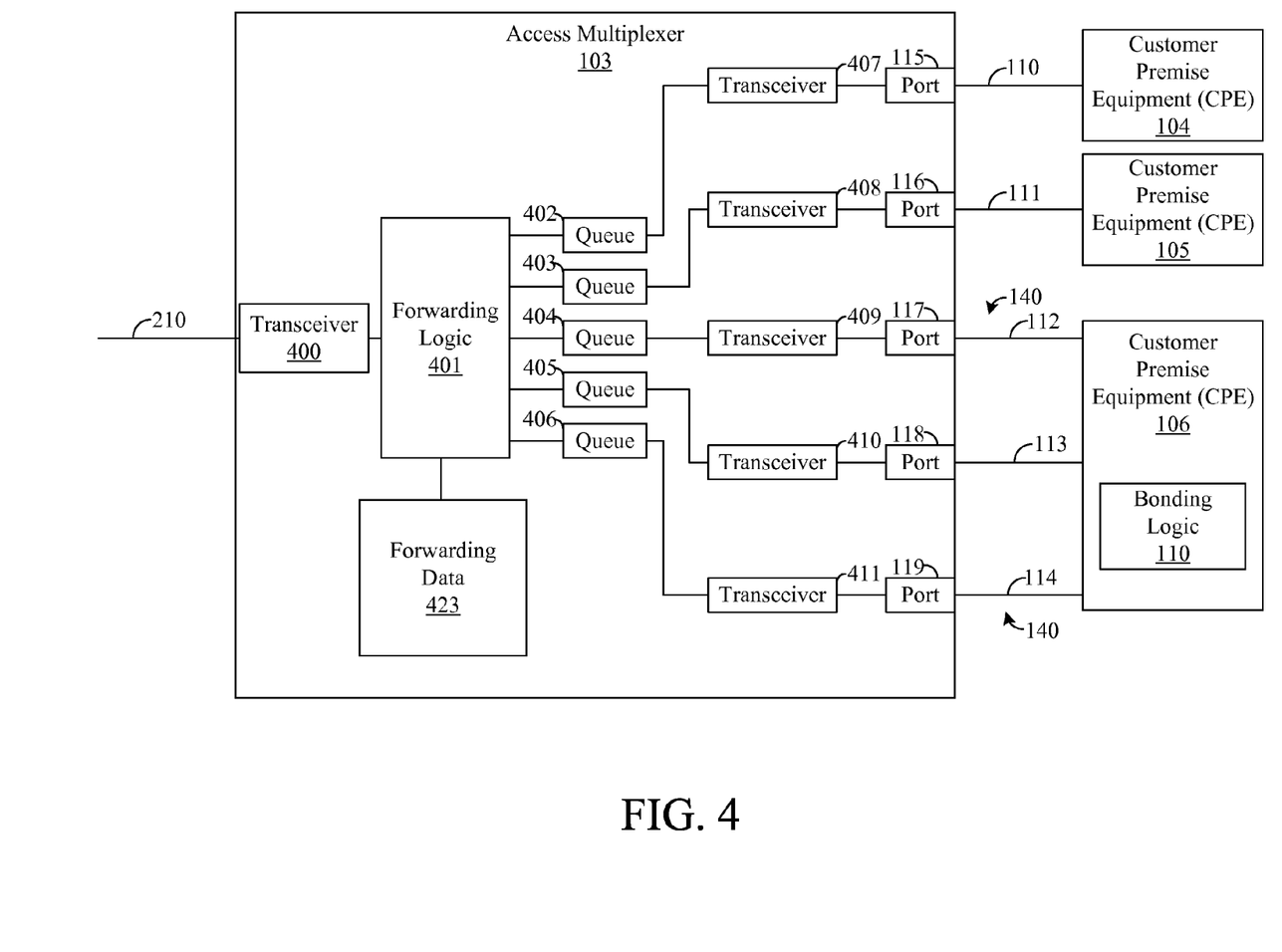
FIG. 4 is a block diagram depicting an exemplary embodiment of an access multiplexer, such as is depicted in FIG. 1.

FIG. 4 depicts an access multiplexer 103 in accordance with an embodiment of the present disclosure. The access multiplexer 103 comprises a transceiver 400 that is communicatively coupled to the connection 210. Such connection 210 propagates data packets, including the egress packets comprising fragments from the communication module 107 (FIG. 1).

In addition, the access multiplexer 103 comprises forwarding logic 401 that is communicatively coupled to a plurality of queues 402-406. Each of the queues 402-406 is communicatively coupled to and corresponds to one of a plurality of transceivers 407-411, respectively. Each transceiver 407-411 is communicatively coupled to and corresponds to a respective communication connection 110-114, and each connection 110-114 is communicatively coupled to CPE 104-106.

During operation, a data packet (not shown) is received by the transceiver 400 from the communication module 107 (FIG. 1). As described hereinabove, the data packet may be transmitted via a packet network 102 (FIG. 1) or the connection 210 may be a direct connection such as, for example, an optical fiber that extends from the communication module 107 to the access multiplexer 103.

The data packet received comprises payload data and a header. The information contained in the header comprises an identifier (e.g., a destination address) that indicates the connection 110-114 across which the data packet is to be transmitted. As described above, the packets (referred to as "egress packets") to be transmitted across the bonded connections 112-114 carry fragments as payload and have a connection identifier that is assigned by the distributor 201 (FIG. 2).

The forwarding logic 401 receives the data packet from the transceiver 400. Upon receipt of the data packet, the forwarding logic 401 determines across which connections 110-114 the data packet is to be sent. As an example, the forwarding logic 401 may analyze the header of the data packet and determine based on the forwarding data 423 which connection 110-114 corresponds to the connection identifier contained in the header. The forwarding logic 401 transmits the data packet to the queue 402-406 that feeds the identified connection 110-114. Each transceiver 407-411 pulls data packets from the queue 402-406 coupled to it and transmits such data packets to its corresponding port 115-119. Each CPE 104-106 de-encapsulates the data packets received from the connections 110-114.

Figure 5:
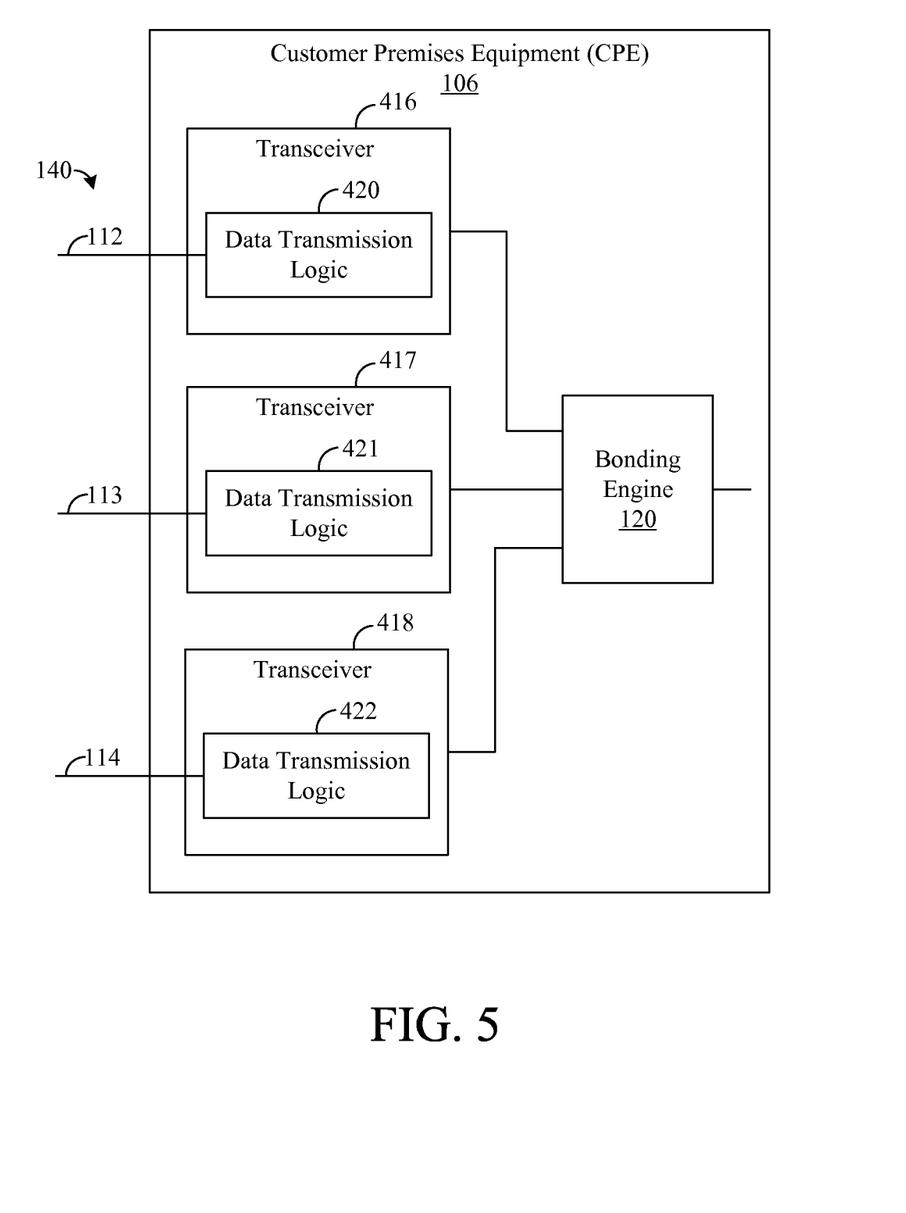
FIG. 5 is a block diagram depicting an exemplary embodiment of customer premise equipment (CPE), such as is depicted in FIG. 1.

As shown by FIG. 5, the CPE 106 comprises a plurality of transceivers 416-418 respectively coupled to the connections 112-114. As described above, the payload of the data packets (referred to as "egress packets") carried by the bonded connections 112-114 define fragments of the original data packets (referred to as "ingress packets") previously fragmented by the fragmenter 200 (FIG. 2). Each transceiver 416-418 receives the egress packets transmitted across its respective connection 112-114 and de-encapsulates each such packets to recover the fragments carried by them. The recovered fragments are transmitted to the bonding engine 120, which recombines the fragments to recover the ingress packets previously fragmented by the fragmenter 200 (FIG. 2). The ingress packets are then transmitted by the bonding engine 120 to other components of the CPE 106 for further processing. As an example, the ingress packets may be de-encapsulated, or the stream of original data packets transmitted from the bonding engine 120 may be demultiplexed. In addition, the ingress packets or the payload of the ingress packets may be transmitted to at least one user device 136 (FIG. 1).

In one embodiment, each of the transceivers 416-418 further comprises data transmission logic 420-422, respectively, as shown by FIG. 5. Such logic 420-422 can be implemented in hardware, software, firmware, or any combination thereof. The data transmission logic 420-422 from time-to-time transmits control data to the network bonding engine 108 (FIG. 2). As an example, the control data may be transmitted via control packets that define a control channel between the CPE 106 and the communication module 107. Each such control packet comprises a header indicating that the control packet is destined for the network bonding engine 108. In addition, the control packet comprises payload data indicative of the current receive rate of the transceiver 416-418 from which the control packet originates. Note that such receive rate should be the same as the transmission rate of the corresponding transceiver 409-411 (FIG. 4) at the access multiplexer 103.

Each control packet is received by the network bonding engine 108, which de-encapsulates such packet to recover the payload data. The payload data indicates the receive rate of the transceiver 416-418 that transmitted the data packet and, hence, the downstream transmission rate of the connection 112-114 coupled to such transceiver. The network bonding engine 108 stores such transmission rate in the transmission rate data 210 (FIG. 2). As described above, the network bonding engine 108 uses the data transmission rate data 210 to decrease the bit counts of the accumulators 204-206 (FIG. 2). By decreasing the bit count of an accumulator 204-206 at the downstream transmission rate indicated for the associated connection 112-114, the accumulator 204-206 accounts for the emptying of the associated queue 404-406 (FIG. 4) due to the transmission of data from such queue across a connection 112-114. By increasing the bit count of an accumulator 204-206 for each fragment allocated to the associated connection 112-114, the accumulator 204-206 accounts for the filling of the associated queue due to data from the bonding engine 108. Thus, the bit count in a given accumulator 204-206 represents an estimate of the number of bits currently queued in the associated queue 404-406.

Figure 6:
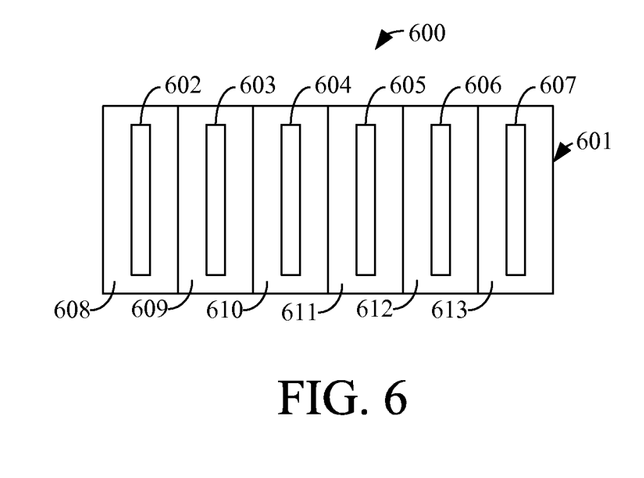
FIG. 6 depicts an exemplary embodiment of a chassis in accordance with the present disclosure.

FIG. 6 depicts an embodiment of an exemplary chassis 600 that may be used for holding the access multiplexer 103 or other modules for communicating with the CPE 104-106. The chassis 600 comprises a plurality of cards 602-607 inserted into a plurality of slots 608-613, respectively. In one embodiment, the access multiplexer 103 resides on one of the cards 602-607. In another embodiment, the bonded connections 112-114 are coupled to a plurality of the cards 602-607. In such an embodiment, the network bonding engine 108 may transmit egress packets through the packet network 102, and the egress packets may be forwarded across the appropriate connections 112-114, as allocated by the network bonding engine 108, according to techniques similar to those described above.

In yet another embodiment, the network bonding engine 108 is local to the cards 602-607 such that it is unnecessary for the bonding engine 108 to packetize fragments for transmission through the packet network 102 (FIG. 1) as is described above. As an example, the network bonding engine 108 may reside on one of the cards 602-607 inserted into the slots 608-613 of the chassis 600.

Figure 7:
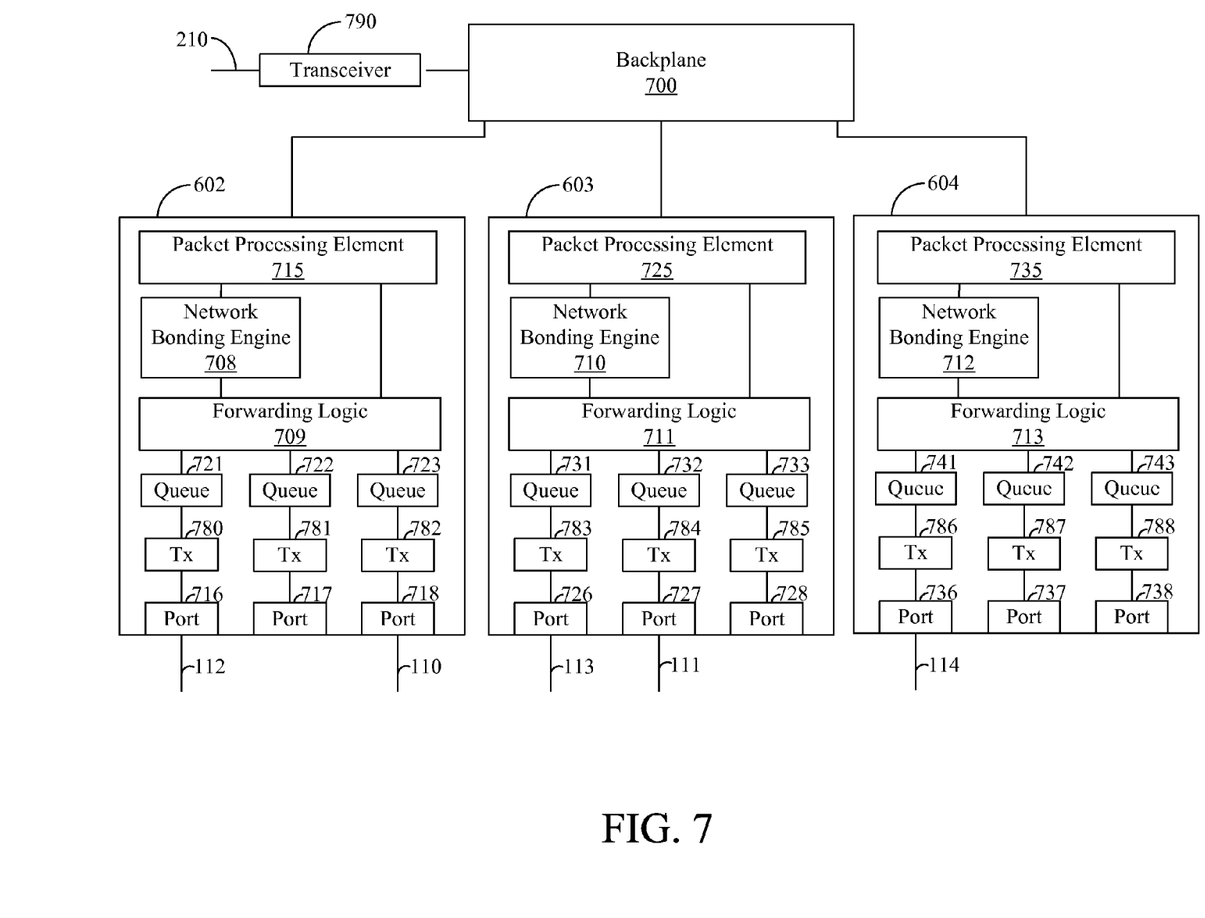
FIG. 7 is a block diagram illustrating a chassis backplane that is coupled to a plurality of access cards, such as is depicted in FIG. 6.

FIG. 7 is a block diagram illustrating a backplane 700 of the chassis 600 depicted in FIG. 6. For simplicity of illustration, FIG. 7 shows three of the cards 602-604, which are communicatively coupled to each other through the backplane 700. Further, the card 602 has a packet processing element 715 that is coupled to a network bonding engine 708 and forwarding logic 709, which is coupled to a plurality of ports 716-718 through queues 721-723 and transceivers 780-782, respectively. The card 603 has a packet processing element 725 that is coupled to a network bonding engine 710 and forwarding logic 711, which is coupled to a plurality of ports 726-728 through queues 731-733 and transceivers 783-785, respectively. The card 604 has a packet processing element 735 that is coupled to a network bonding engine 712 and forwarding logic 713, which is coupled to a plurality of ports 736-738 through queues 741-743 and transceivers 786-788, respectively. Note that the network bonding engines 708, 710, 712, the packet processing elements 715, 725, 735, and the forwarding logic 709, 711, and 713 may be implemented in hardware, software, firmware, or any combination of hardware, software, and firmware. U.S. patent application Ser. No. 12/359,041, entitled "Systems and Methods for Protecting Bonding Engines in Network Communications," and filed on Jan. 23, 2009, which is incorporated herein by reference, describes exemplary techniques that can be used to handle packets in an access multiplexer.

As shown by FIG. 7, the communication connection 112 is coupled to a port 716 of the card 602, and the communication connection 113 is coupled to a port 726 of the card 603. Further, the communication connection 114 is coupled to a port 736 of the card 604. In other embodiments, multiple bonded connections may be coupled to the same card, if desired. However, having the connections of a bonding group spread out among a plurality of cards generally enhances robustness such that if a card of the bonding group fails, the failure will likely have a less pronounced effect on the aggregate data rate of the bonding group.

Data packets received by a transceiver 790 from a network connection 210 and destined for the CPE 106 serviced by the bonding group 140 are forwarded to the network bonding engine 708, which fragments each received data packet. Further, the network bonding engine 708 has accumulators (not shown in FIG. 7), like the network bonding engine 108 of FIG. 1. Each accumulator has a bit count indicative of the current queue depth for an associated one of the queues 721, 731, and 741, and the network bonding engine 708 allocates the fragments across the bonded connections 112-114 according to the same or similar techniques described above for the network bonding engine 108 of FIG. 1.

In this regard, if the network bonding engine 708 determines that the connection 112 coupled to the same card 602 is to carry a fragment, the bonding engine 708 appends a connection identifier identifying the connection 112 to the fragment and transmits the fragment (along with its appended connection identifier) to the forwarding logic 709, which forwards the fragment to the queue 721 based on the appended connection identifier. The bonding engine 708 also increases the bit count in the associated accumulator (not shown in FIG. 7) by the number of bits in the fragment.

If the network bonding engine 708 determines that a connection 113 or 114 coupled to a different card is to carry a fragment, then the bonding engine 708 appends to the fragment a connection identifier identifying such connection and transmits the fragment (along with the appended connection identifier) to the backplane 700, which uses the connection identifier to transmit the fragment to the appropriate card 603 or 604 for transmission across the identified connection 113 or 114.

In one embodiment, the forwarding logic 709, 711, or 713, upon receiving a fragment, separates the connection identifier from the fragment such that only the fragment is inserted into a queue 721, 731, or 741 for transmission across the identified connection 112, 113. Or 114. Thus, the network bonding engine 708 does not increase the bit count of the associated accumulator (not shown in FIG. 7) by the total number of bits transmitted to the card 603 (including both the fragment and the connection identifier) but instead increases such bit count by the number of bits of the fragment. In this regard, since the connection identifier is removed before insertion of the fragment into a queue 721, 731, or 741, the connection identifier does not affect the queue depth of the queue, and there is no need to account for the connection identifier in the accumulator's bit count that is tracking such queue depth.

Figure 8:
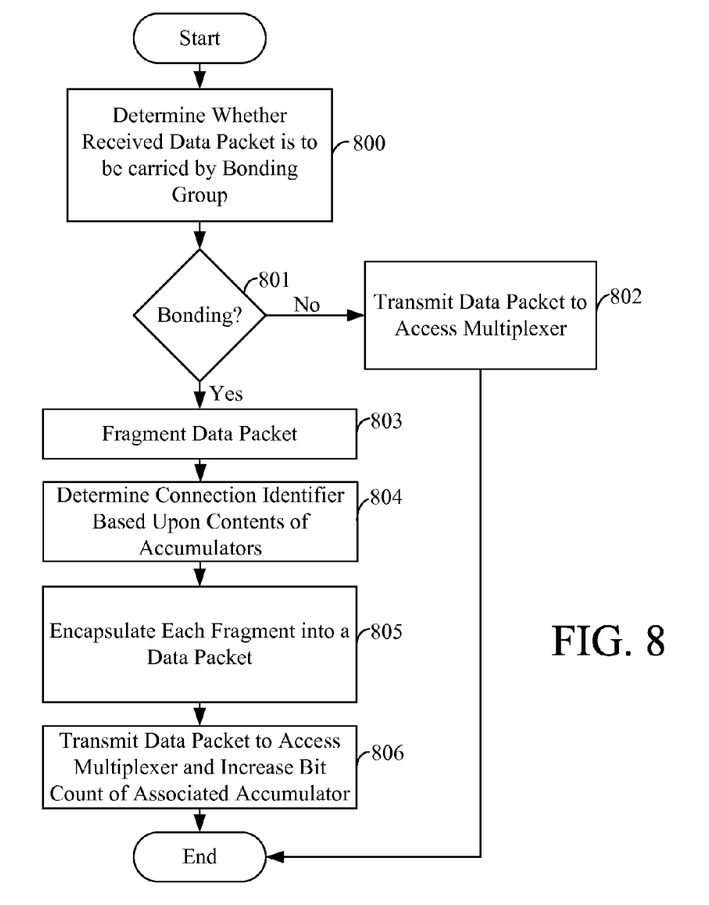
FIG. 8 is a flowchart depicting an exemplary method of communicating data in a communication system, such as is depicted in FIG. 1.

FIG. 8 is a flowchart depicting exemplary architecture and functionality of the communication module 107 (FIG. 1). In step 800, the communication module 107 determines whether a received data packet is destined for a user device 136 (FIG. 1) serviced by the bonding group 140 comprising connections 112-114 and, hence, whether the data packet is to be carried by the bonding group 140.

In step 801, if the data packet is not to be carried by the bonding group 140, the communication module 107 transmits the data packet to the access multiplexer 103 in step 802. In step 801, if the data packet is to be carried by the bonding group 140, then in step 803, the communication module 107 fragments the data packet. In step 804, the communication module 107 determines a connection identifier for the fragment based upon the contents of the accumulators 204-206. In this regard, the distributor 201 checks the bit counts of the accumulators 204-206 to determine which accumulator has the lowest bit count. The distributor 201 then looks up the connection identifier associated with such accumulator in the connection identifier data 208 (FIG. 2). In other embodiments, other techniques for selecting a connection 112-114 to carry the fragment are possible.

In step 805, the communication module 107 encapsulates each fragment into a data packet comprising a header that identifies the connection 112-114 (FIG. 1) that is to carry the such packet. In step 806, the communication module 107 transmits the data packet to the access multiplexer 103 and increases the bit count of the accumulator 204-206 that is associated with the connection 112-114 selected for carrying the fragment.

Figure 9:
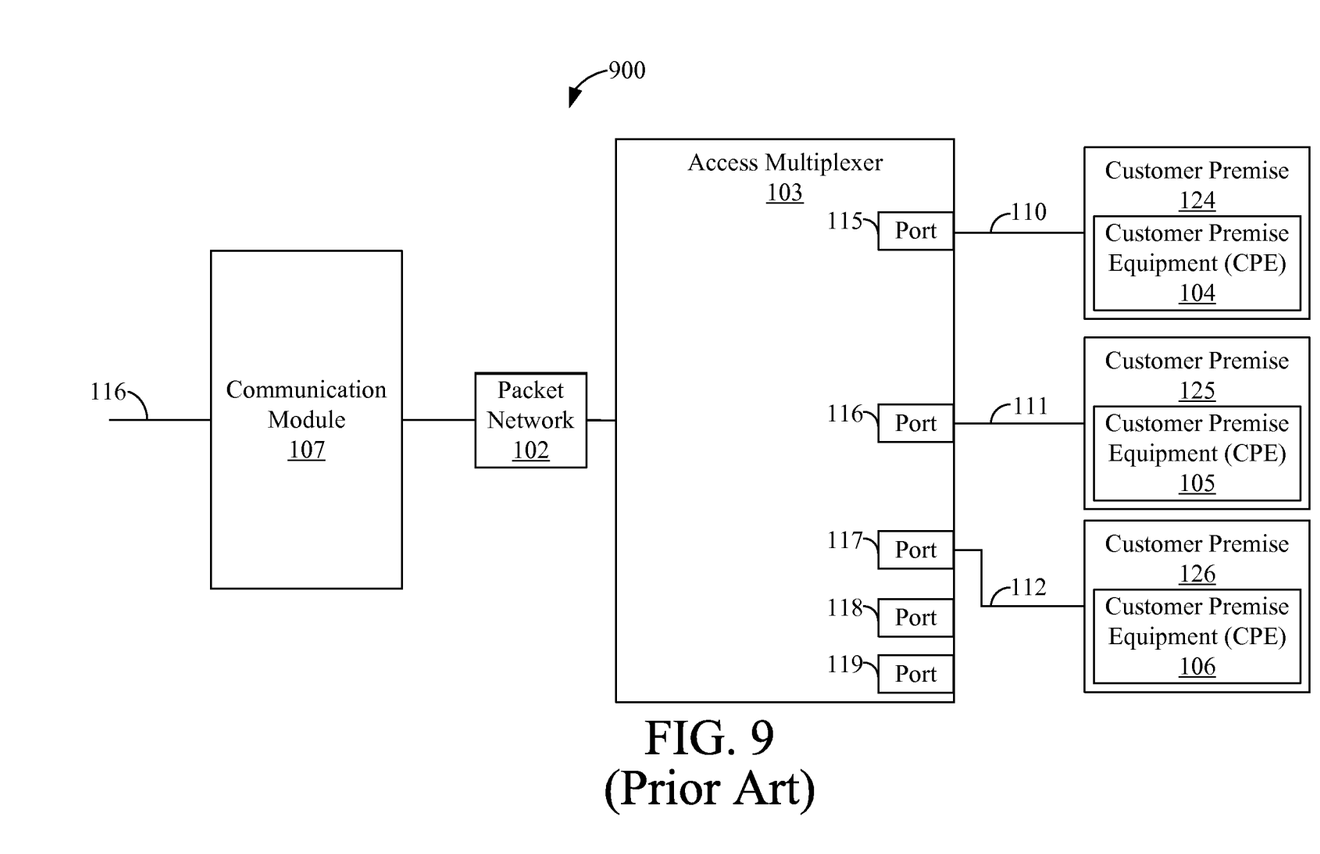
FIG. 9 is a block diagram depicting a conventional communication system that may be modified to form the exemplary system depicted in FIG. 1.

FIG. 9 is a block diagram depicting a conventional communication system 900 that may be modified to provide the exemplary system 100 shown by FIG. 1. The conventional communication system 900 is similar to the system 100 of FIG. 1 except that the customer premises 926 has CPE 906 coupled to a single connection 111, as shown by FIG. 9. Thus, the data rate provided to the CPE 906 is relatively low.

However, system 900 may be modified in order to provide a higher aggregate data rate for the customer associated with CP 126. In particular, a network bonding engine 108 may be added to the communication module 107, and the CPE 906 may be replaced with CPE 106, which is coupled to the connections 112-114. Further, as described above, the CPE 106 has a bonding engine 120 for bonding the connections 112-114 to provide a higher aggregate data rate than was provided to the CPE 906. Thus, the conventional system 900 is effectively converted to the system 100 shown by FIG. 1 and described above. For such conversion, it is unnecessary to modify or replace the access multiplexer 103, which may be located at an intermediate point between a network facility, such as a central office, and the CP 126.

The invention claimed is:

1. A system, comprising:
memory for storing data indicative of data rates for transceivers coupled to a bonding group, the transceivers coupled to a plurality of queues; and
logic configured to determine a plurality of values based on the data, each of the values indicating an estimated number of bits in a respective one of the queues and based on the data rate indicated by the data for a respective one of the transceivers, the logic configured to receive a data packet and to fragment the data packet into a plurality of fragments, the logic further configured to allocate the fragments to communication connections of the bonding group based on the values and to transmit the fragments to the transceivers such that each of the fragments is transmitted across the respective communication connection to which the fragment is allocated.

2. The system of claim 1, wherein the logic is further configured to determine whether the data packet is to be fragmented based on a destination address of the data packet.

3. The system of claim 1, wherein the logic is configured to adjust one of the values based on a size of one of the fragments.

4. The system of claim 1, wherein the logic is configured to adjust one of the values based on a leaky bucket algorithm such that the one value is decreased according to the data rate indicated by the data for one of the transceivers.

5. The system of claim 1, wherein the logic is further configured to receive control data from customer premises equipment coupled to the transceivers, the control data indicating data rates of the transceivers, the logic further configured to update the data stored in the memory based on the control data.

6. The system of claim 1, wherein the logic is configured to append to each of the fragments a respective connection identifier identifying the communication connection to which the fragment is allocated.

7. The system of claim 1, wherein the logic, for one of the fragments, is configured to determine a metric associated with one of the communication connections, the metric based on one of the values, a size of the one fragment, and a data rate indicated by the data for one of the transceivers coupled to the one communication connection, and wherein the logic is configured to allocate the one fragment to the one communication connection based on the metric.

8. The system of claim 7, wherein the logic is configured to determine a latency value indicative of a delay in communicating via the one communication connection, and wherein the metric is based on the latency value.

9. The system of claim 1, wherein the logic is configured to associate one of the values with a threshold and to allocate at least one of the fragments to the communication connections based on a comparison of the one value to the threshold.

10. The system of claim 1, wherein the logic is configured to receive, via a control channel, a control packet indicating a data rate of one of the transceivers, and wherein the logic is configured to update the data stored in the memory based on the control packet.

11. The system of claim 10, wherein the control packet is received from customer premises equipment in communication with the one transceiver.

12. The system of claim 1, wherein the logic is configured to determine one of the values based on a data rate indicated by the data for one of the transceivers and a value indicative of a number of bits allocated by the logic to the communication connection coupled to the one transceiver.

13. A bonding method, comprising:
storing, in memory, data indicative of data rates for transceivers coupled to a bonding group, the transceivers coupled to a plurality of queues;
determining a plurality of values based on the data, each of the values indicating an estimated number of bits in a respective one of the queues and based on the data rate indicated by the data for a respective one of the transceivers;
receiving a data packet;
fragmenting the data packet into a plurality of fragments;
controlling which of the transceivers are to transmit the fragments across the bonding group based on the values; and
transmitting the fragments to the transceivers.

14. The method of claim 13, further comprising determining whether the data packet is to be fragmented based on a destination address of the data packet.

15. The method of claim 13, further comprising adjusting one of the values based on a size of one of the fragments.

16. The method of claim 13, further comprising adjusting one of the values based on a leaky bucket algorithm such that the one value is decreased according to the data rate indicated by the data for one of the transceivers.

17. The method of claim 13, further comprising:
receiving control data from customer premises equipment coupled to the transceivers, the control data indicating data rates of the transceivers; and
updating the data stored in the memory based on the control data.

18. The method of claim 13, further comprising appending to each of the fragments a respective connection identifier identifying a respective communication connection of the bonding group.

19. The method of claim 13, further comprising determining, for one of the fragments, a metric associated with a communication connection of the bonding group, the metric based on one of the values, a size of the one fragment, and a data rate indicated by the data for one of the transceivers coupled to the communication connection, wherein the controlling is based on the metric.

20. The method of claim 19, further comprising determining a latency value indicative of a delay in communicating via the communication connection, wherein the metric is based on the latency value.

21. The method of claim 13, further comprising:
associating one of the values with a threshold; and
comparing the one value to the threshold,
wherein the controlling is based on the comparing.

22. A system, comprising:
a plurality of transceivers;
a plurality of communication connections, each of the communication connections coupled to a respective one of the transceivers and to customer premises equipment at a customer premises;
a plurality of queues, each of the queues coupled to a respective one of the transceivers; and
logic configured to bond the communication connections, the logic configured to receive a first data packet and to fragment the first data packet into a plurality of fragments, the logic configured to respectively associate a plurality of values with the communication connections, each of the values indicating an estimated queue depth of a respective one of the queues that is coupled to the associated communication connection, the logic configured to receive rate data, the rate data indicative of data rates for communicating across the communication connections by the transceivers, the logic configured to update the values based on the rate data and to allocate the fragments to the communication connections based on the values.

23. The system of claim 22, wherein the logic is configured to append an identifier to one of the fragments, the identifier identifying the communication connection allocated to the one fragment by the logic.

24. The system of claim 22, further comprising forwarding logic configured to forward, based on the identifier, the one fragment to one of the queues coupled to the communication connection allocated to the one fragment.

25. The system of claim 24, wherein the forwarding logic is configured to separate the identifier from the fragment.

26. The system of claim 22, wherein the logic is configured to encapsulate one of the fragments into a second data packet.

27. The system of claim 26, wherein the logic is configured to select a connection identifier for the second data packet based on which of the communication connections is allocated to the one fragment by the logic, and wherein the logic is configured to insert the connection identifier into a header of the second data packet.

28. The system of claim 22, wherein the logic is configured to update the values based on a leaky bucket algorithm.

29. The system of claim 22, wherein the logic is configured to receive the rate data from the customer premises equipment.

30. A system, comprising:
a plurality customer premises (CP) transceivers at a customer premises;
a plurality of network transceivers coupled to the CP transceivers via a plurality of communication connections;
memory for storing data indicative of data rates for the network transceivers; and
logic configured to receive, via a control channel, control packets indicative of the data rates, the logic configured to update the data stored in the memory based on the control packets, wherein the logic is configured to determine a plurality of values based on the data, each of the values associated with a respective one of the network transceivers and indicating an estimated number of bits queued for transmission by the associated network transceiver, each of the values based on the data rate indicated by the data for the associated network transceiver and based on a number of bits allocated by the logic to a respective one of the communication connections coupled to the associated network transceiver, wherein the logic is configured to receive a data packet and to fragment the data packet into a plurality of fragments, wherein the logic is configured to allocate the fragments to the communication connections based on the values and to transmit the fragments to the network transceivers such that each of the fragments is transmitted across the respective communication connection to which the fragment is allocated.

31. The system of claim 1, wherein the control packets are transmitted by the CP transceivers.

\* \* \* \* \*